United States Patent
Chen et al.

(10) Patent No.: US 11,882,181 B2
(45) Date of Patent: Jan. 23, 2024

(54) METHOD, DEVICE, AND COMPUTER PROGRAM PRODUCT FOR DATA STORAGE

(71) Applicant: Dell Products L.P., Round Rock, TX (US)

(72) Inventors: Si Chen, Shanghai (CN); Zhenzhen Lin, Shanghai (CN); Anzhou Hou, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/673,459

(22) Filed: Feb. 16, 2022

(65) Prior Publication Data
US 2023/0239350 A1  Jul. 27, 2023

(30) Foreign Application Priority Data

Jan. 21, 2022 (CN) .......................... 202210071908.6

(51) Int. Cl.
| H04L 12/24 | (2006.01) |
| H04L 41/0803 | (2022.01) |
| H04L 67/1097 | (2022.01) |
| H04L 67/52 | (2022.01) |

(52) U.S. Cl.
CPC .......... *H04L 67/1097* (2013.01); *H04L 67/52* (2022.05)

(58) Field of Classification Search
CPC ............................ H04L 67/1097; H04L 67/52
USPC ....................................................... 709/213
See application file for complete search history.

(56) References Cited

U.S. PATENT DOCUMENTS

| 7,818,402 | B1 | 10/2010 | Zhang |
| 11,005,703 | B1* | 5/2021 | Wu ..................... H04L 67/1034 |
| 11,416,465 | B1* | 8/2022 | Anwar .................. G06F 16/285 |
| 11,537,619 | B1* | 12/2022 | Goyal ............... G06F 16/24568 |
| 11,544,229 | B1* | 1/2023 | Seideman ........... G06F 16/2358 |
| 2005/0198286 | A1* | 9/2005 | Xu .......................... H04L 45/02 709/225 |
| 2010/0115133 | A1* | 5/2010 | Joshi ................... H04L 67/1014 709/245 |

(Continued)

OTHER PUBLICATIONS

P. Maymounkov et al., "Kademlia: A Peer-to-Peer Information System Based on the XOR Metric," First International Workshop on Peer-to-Peer Systems (IPTPS), Mar. 7-8, 2002, 6 pages.

*Primary Examiner* — Moustafa M Meky
*Assistant Examiner* — Elizabeth Kassa
(74) *Attorney, Agent, or Firm* — Ryan, Mason & Lewis, LLP

(57) ABSTRACT

Embodiments of the present disclosure relate to a method, an electronic device, and a computer program product for data storage. The method includes determining, based on attribute information of each of a set of nodes in a distributed storage system, a hash value of each of the set of nodes; determining a node identifier of each of the set of nodes based on geographic location information of each of the set of nodes and the hash value, with the node identifier being used to indicate a logical location of a node in the distributed storage system; and determining, in response to a processing request from a first node in the set of nodes for first data, a target node in the set of nodes based on the node identifier of each of the set of nodes. The target node is used to process the processing request for the first data.

20 Claims, 5 Drawing Sheets

(56) References Cited

U.S. PATENT DOCUMENTS

| | | | |
|---|---|---|---|
| 2010/0169280 A1* | 7/2010 | Shi | H04L 67/1046 |
| | | | 709/224 |
| 2013/0151683 A1* | 6/2013 | Jain | G06F 3/0611 |
| | | | 709/223 |
| 2016/0197831 A1* | 7/2016 | De Foy | H04L 45/7453 |
| | | | 370/392 |
| 2016/0301751 A1 | 10/2016 | Peelen et al. | |
| 2017/0272100 A1 | 9/2017 | Yanovsky et al. | |
| 2019/0163372 A1 | 5/2019 | Sridharan | |
| 2020/0012619 A1 | 1/2020 | Gupta et al. | |
| 2020/0036789 A1 | 1/2020 | Mehta et al. | |
| 2020/0301883 A1 | 9/2020 | Kamiya et al. | |
| 2021/0126970 A1* | 4/2021 | Zhang | G06F 16/2255 |
| 2021/0168207 A1 | 6/2021 | Lin et al. | |
| 2022/0182243 A1* | 6/2022 | Wang | H04L 45/64 |
| 2022/0245093 A1* | 8/2022 | Batsakis | G06F 16/2477 |
| 2022/0292068 A1* | 9/2022 | Lin | G06F 16/245 |

* cited by examiner

METHOD, DEVICE, AND COMPUTER PROGRAM PRODUCT FOR DATA STORAGE

RELATED APPLICATION(S)

The present application claims priority to Chinese Patent Application No. 202210071908.6, filed Jan. 21, 2022, and entitled "Method, Device, and Computer Program Product for Data Storage," which is incorporated by reference herein in its entirety.

FIELD

Embodiments of the present disclosure generally relate to the field of computers, and more particularly, to a method, a device, and a computer program product for data storage.

BACKGROUND

Currently, more and more clouds, edge nodes, and a large number of clients participate in 5G networks and edge storage and computing in the form of nodes. Various types of nodes are connected together to form a distributed storage system (also known as a distributed storage network) for use in providing high throughput and high availability of data to users.

Distributed storage systems based on edge storage and organized according to a decentralized manner have been proposed. As more and more nodes participate therein, a search mechanism (such as a distributed hash table) for stored data needs to traverse a longer search path or go through more hops to find metadata of the data, resulting in a decrease in performance of the distributed storage system. Therefore, a need exists for a more optimized storage system architecture and search mechanism for stored data to improve the performance of distributed storage systems.

SUMMARY

Embodiments of the present disclosure provide a method, a device, and a computer program product for data storage.

In a first aspect of the present disclosure, a method for data storage is provided. The method includes: determining, based on attribute information of each of a set of nodes in a distributed storage system, a hash value of each of the set of nodes. The method further includes: determining a node identifier of each of the set of nodes based on geographic location information of each of the set of nodes and the hash value. The node identifier is used to indicate a logical location of a node in the distributed storage system. The method further includes: determining, in response to a processing request from a first node in the set of nodes for first data, a target node in the set of nodes based on the node identifier of each of the set of nodes. The target node is used to process the processing request for the first data.

In a second aspect of the present disclosure, an electronic device is provided. The electronic device includes at least one processing unit and at least one memory. The at least one memory is coupled to the at least one processing unit and stores instructions for execution by the at least one processing unit. The instructions, when executed by the at least one processing unit, cause the electronic device to perform actions including: determining, based on attribute information of each of a set of nodes in a distributed storage system, a hash value of each of the set of nodes; determining a node identifier of each of the set of nodes based on geographic location information and the hash value of each of the set of nodes, the node identifier being used to indicate a logical location of a node in the distributed storage system; determining, in response to a processing request from a first node in the set of nodes for first data, a target node in the set of nodes based on the respective node identifiers of the set of nodes, the target node being used to process the processing request for the first data.

In a third aspect of the present disclosure, a computer program product is provided. The computer program product is tangibly stored in a non-transitory computer storage medium and includes machine-executable instructions. The machine-executable instructions, when executed by a machine, cause the machine to execute any step of the method according to the first aspect of the present disclosure.

This Summary is provided to introduce selected concepts in a simplified form, which will be further described in the Detailed Description below. The Summary is neither intended to identify key features or essential features of the present disclosure, nor intended to limit the scope of the present disclosure.

BRIEF DESCRIPTION OF THE DRAWINGS

The above and other objectives, features, and advantages of the present disclosure will become more apparent through description provided herein of example embodiments of the present disclosure, with reference to the accompanying drawings, and in the example embodiments of the present disclosure, the same reference numerals generally represent the same components.

Identical or corresponding numerals represent identical or corresponding parts in various accompanying drawings.

DETAILED DESCRIPTION

Figure 1:
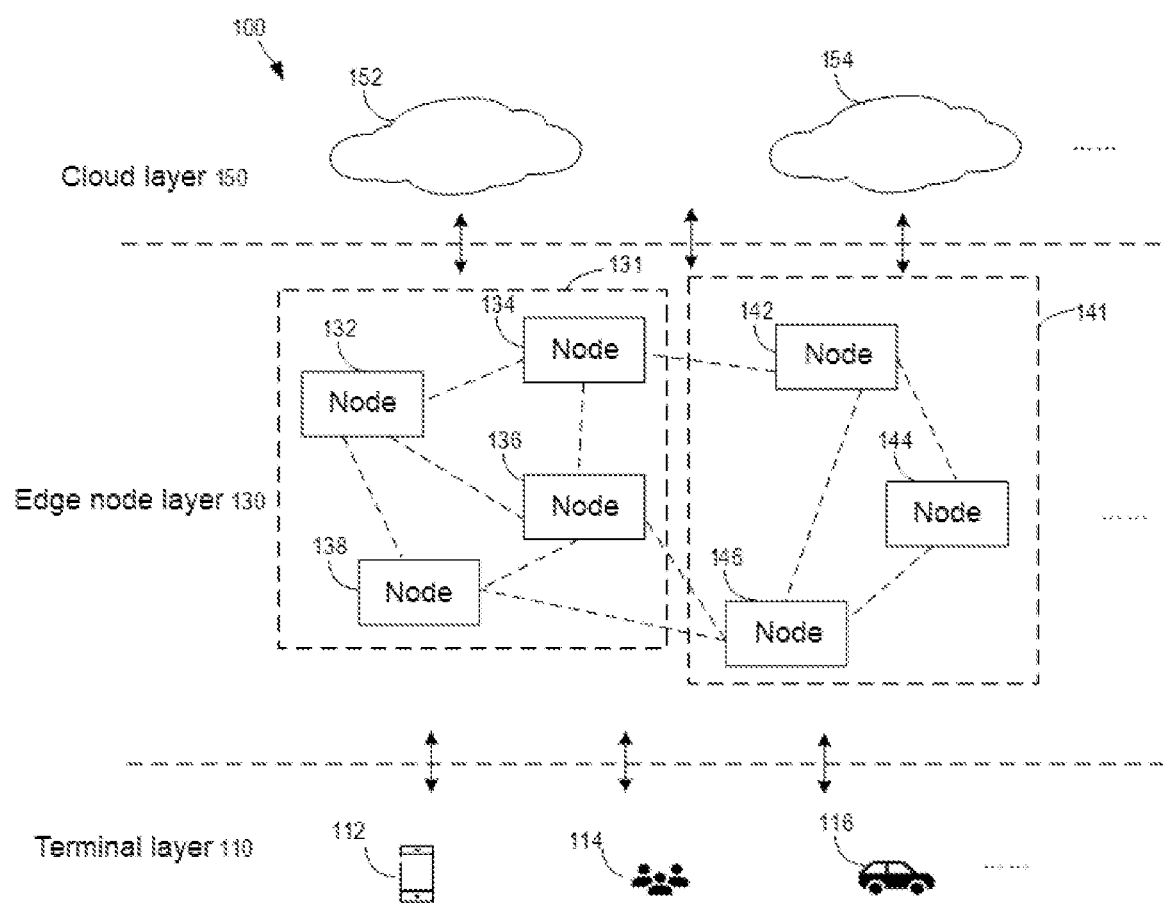
FIG. 1 illustrates a schematic block diagram of an example distributed storage system in which some embodiments according to the present disclosure can be implemented.

Example embodiments of the present disclosure will be described in more detail below with reference to the accompanying drawings. Although example embodiments of the present disclosure are illustrated in the accompanying drawings, it should be understood that the present disclosure may be implemented in various forms and should not be limited by the embodiments illustrated herein. Rather, these embodiments are provided to make the present disclosure more thorough and complete and to fully convey the scope of the present disclosure to those skilled in the art.

The term "include" used herein and variants thereof indicate open-ended inclusion, that is, "including but not limited to." Unless otherwise stated, the term "or" means "and/or." The term "based on" denotes "at least partially based on." The terms "an example embodiment" and "an embodiment" denote "at least one example embodiment." The term "another embodiment" means "at least one further embodiment." The terms "first," "second," and the like may refer to different or the same objects. Other explicit and implicit definitions may also be included below.

As mentioned above, nodes in a distributed storage system based on edge storage are generally organized in a decentralized manner. When a client requests to access application data, it is first necessary to find metadata of the application data in a distributed hash table of the distributed storage system to locate the data. However, the request for searching for the metadata will be forwarded multiple times in decentralized global nodes to obtain the metadata indicating the storage location of the application data.

The inventors have noted that considering device mobility and data mobility, application data is often requested or shared between nodes within the same region to ensure service continuity. In particular, in scenarios such as smart manufacturing and autonomous driving, data especially needs to be transmitted more efficiently within a specific region rather than being requested or shared across regions in a global network.

However, in conventional decentralized solutions, the correlation between geographic locations of nodes is not taken into account. Such conventional mechanisms allow decentralized nodes in the global view to be treated equally. For example, geographically (also called physically) adjacent nodes may possibly be logically distant from each other. In contrast, nodes that are geographically distant from each other may possibly be logically adjacent. As a result, since nodes are not informed of the existence of their physically adjacent nodes, requests for data consumption within each region are affected by inefficiencies in addressing a target node. This in turn leads to inefficient data sharing with high latency among edge nodes (e.g., edge servers).

In addition, data searching also suffers from inefficiencies in conventional decentralized solutions. In conventional solutions, the metadata for data generated by a certain source node will be broadcast to decentralized machines and stored in a logically adjacent target node. However, this target node may possibly be physically distant from the source node that generated the data, or even physically distant from the region where the current node is located. In this case, a search for data or data blocks usually takes several hops because the metadata is stored in a target node distant from the region where the source node is located. In each hop, a node that is physically distant and has a high response latency may be asked if it holds the data. As a result, this makes data searching take a long time.

In view of this, embodiments of the present disclosure provide a method for data storage to address one or more of the above problems and/or other potential problems. In this solution, both the geographic location information of each node and the hash value of the node are jointly used to determine the node identifier of the node. The node identifier of each node is used to determine the logical location of the node in the distributed storage system, i.e., the location in a hash space. Furthermore, in this solution, in response to a data processing request, a target node is determined based on node identifiers of the nodes.

This solution takes into account the geographic location information of each node in terms of logical spatial locating of nodes and in terms of determining a target node in response to the data processing request. This geographically perceptive edge node distribution solution enables more efficient data sharing and data searching in distributed storage systems. In particular, it can be ensured that lower latency and higher efficiency can be achieved for data requests or data searching in the same region.

The fundamental principles and several example embodiments of the present disclosure will be described in detail below with reference to the accompanying drawings. FIG. 1 illustrates a schematic diagram of distributed storage system 100 for data storage according to some embodiments of the present disclosure. It should be understood that the numbers and arrangement of entities, elements, and modules illustrated in FIG. 1 are examples only, and different numbers and different arrangements of entities, elements, and modules can be included in distributed storage system 100.

As shown in FIG. 1, distributed storage system 100 in an edge computing environment may be implemented in general as a hierarchical structure including terminal layer 110, edge node layer 130, and cloud layer 150.

Terminal layer 110 typically includes various types of terminal nodes 112, 114, 116, etc. (also referred to as clients). Examples of terminal nodes include, but are not limited to: desktop computers, laptop computers, smart phones, wearable devices, security cameras, smart manufacturing devices, smart home devices, Internet of Things (IoT) devices, smart cars, and the like. It should be understood that while only three terminal nodes are illustrated in FIG. 1, this is merely an example and does not limit the present invention in any way. In distributed storage system 100, any number and any type of terminal nodes may be included.

Terminal nodes 112, 114, and 116 may join distributed storage system 100 via wired or wireless connections according to their geographic locations, network configuration, etc., so as to be communicatively coupled with each other. For example, terminal node 112 may be a smart phone that accesses a corresponding cell based on its geographic location, is connected to the nearest node (also called an edge node), and switches to another node as its location changes. For another example, terminal node 114 may be a smart manufacturing device that accesses a corresponding cell based on its geographic location and is connected to the nearest node. For another example, terminal node 116 may be a smart car, which is connected to a nearby Internet-of-Vehicles edge node according to its location, and is switched to a corresponding nearby Internet-of-Vehicles edge node during driving.

Edge node layer 130 typically includes a plurality of nodes (also referred to as edge nodes or peer nodes) distributed at different geographic locations, for example, nodes 132, 134, 136, 138, 142, 144, and 146. The nodes may join distributed storage system 100, for example, via wired or wireless connections, so as to be communicatively coupled with each other. Herein, a node in edge node layer 130 may be any computing device with computing resources or storage device with storage resources. It should be understood that the number and arrangement of nodes shown in FIG. 1 are merely examples and do not limit the present invention in any way. In distributed storage system 100, any number, any type, and any arrangement of (edge) nodes may be included.

For the purposes of illustration herein, edge node layer 130 is divided into different regions, such as first region 131 and second region 141 shown in the figure. Nodes 132, 134, 136, and 138 located within first region 131 may be considered to be geographically close to each other. Similarly, nodes 142, 144, and 146 located within second region 141 may be considered to be geographically close to each other. It should be understood that the above division of regions is merely an example and not limiting. In some embodiments, larger and smaller regions may be divided, or regions of other shapes may be divided, or regions that contain more or fewer nodes may be divided.

Cloud layer 150 may include a plurality of clouds, such as clouds 152, 154, etc. The clouds may be a plurality of server device clusters provided by various cloud service providers and integrated by software and hardware computing, which provide services as a whole. It should be understood that the number and arrangement of clouds shown in FIG. 1 are merely examples and do not limit the present invention in any way. In distributed storage system 100, any number, any type, and any arrangement of clouds may be included.

In distributed storage system 100, the nodes each have storage capability and communication capability, and can, in response to data access requests from other nodes, establish a communication path with a requesting node so as to transmit the requested data. According to embodiments of the present disclosure, data (also referred to as application data) and metadata thereof are stored in distributed storage system 100, and the metadata may at least include a storage location of the application data, a size of the application data, a source of the application data, and the like. According to embodiments of the present disclosure, a node requesting to access data may search for metadata of the data to obtain a storage location of the data, thereby establishing a communication path with a corresponding node to access the data. As described above, the data search mechanism of existing distributed storage systems is undesirable for efficiently obtaining metadata of application data, resulting in a decrease in performance of the system. Methods for storing data and searching for data according to embodiments of the present disclosure will be described further in detail below with reference to FIG. 2 to FIG. 6 and in conjunction with FIG. 1.

Although distributed storage system 100 of FIG. 1 is illustrated as including a particular number of terminal nodes, edge nodes, and clouds, it should be understood by those of skill in the art that the number of terminal nodes, edge nodes, and clouds in distributed storage system 100 is not limited thereto. In addition, although distributed storage system 100 is shown in FIG. 1 as a topological structure shown in the figure, its topological structure is not limited to this. For example, it may be a tree topology that includes more or fewer hierarchies and any other connections.

An example distributed storage system 100 according to some embodiments of the present disclosure is described above in conjunction with FIG. 1. A flow chart of method 200 for data storage according to some embodiments of the present disclosure will be described below with reference to FIG. 2. Method 200 may be implemented by distributed storage system 100 of FIG. 1. It should be understood that method 200 can also be performed by other appropriate devices or apparatuses. Method 200 may include additional actions not shown and/or may omit actions shown, and the scope of the present disclosure is not limited in this regard. For ease of description, method 200 will be described with reference to FIG. 1.

Figure 2:
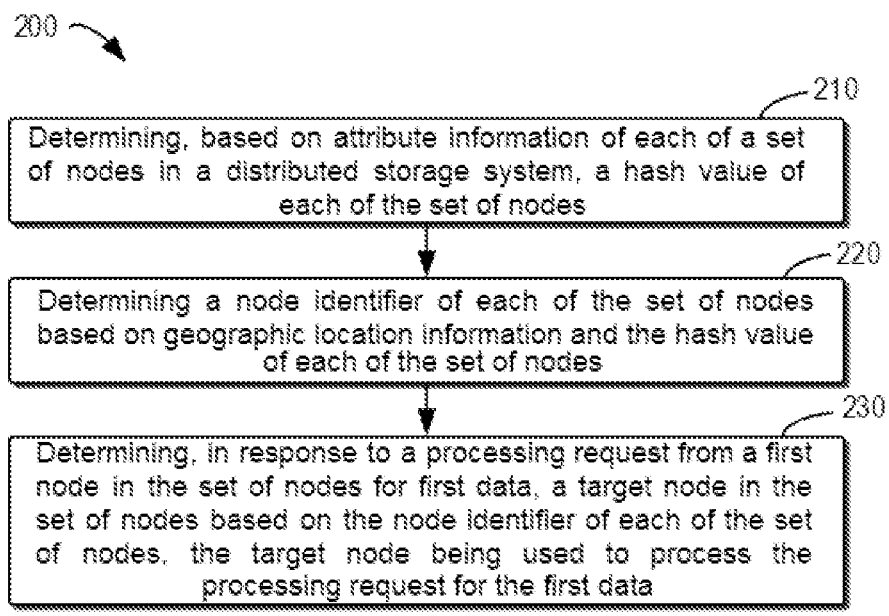
FIG. 2 illustrates a flow chart of an example method for data storage according to some embodiments of the present disclosure.

As shown in FIG. 2, at block 210, distributed storage system 100 determines, based on attribute information of each of a set of nodes in distributed storage system 100, a hash value of each of the set of nodes. The attribute information of a node may include, for example: a name of the node (e.g., a device name), an IP address of the node, and the like. In some embodiments, distributed storage system 100 may employ any appropriate hash algorithm, such as SHA256, to determine the hash values of the nodes based on the attribute information of the nodes. The hash value of a node may be expressed in hexadecimal or binary. It should be understood that the SHA256 listed above is only an example and not limiting. Here and elsewhere in the text, any appropriate hash algorithm may be used to compute hash values for the nodes or for the data.

At block 220, distributed storage system 100 determines a node identifier of each of the set of nodes based on geographic location information and the determined hash value of each of the set of nodes. Herein, the node identifier is also referred to as a geography-based node identifier. The node identifier is used to indicate the logical location of a node in distributed storage system 100, such as in a hash space. The node identifier may be represented in hexadecimal or binary form. The geographic location information of a node may be determined using any location method, such as GPS location. This solution is not limited in this regard.

In some embodiments, distributed storage system 100 may determine a location prefix of each of the set of nodes based on the geographic location information of each of the set of nodes. The location prefix may be in hexadecimal or binary form and may have a predetermined number of bits. Alternatively or additionally, the number of bits of the location prefix may be determined based on the division size of each geographic region in distributed storage system 100 or the number of nodes within each region.

In some embodiments, distributed storage system 100 may determine a prefix of a first node that is located in a first geographic region as a first prefix. For example, distributed storage system 100 may set the prefixes of nodes 132, 134, 136, and 138 in first region 131 all as the first prefix. Taking a location prefix having a predetermined three bits as an example, the prefixes of nodes 132, 134, 136, and 138 may be set to 000. Distributed storage system 100 may also determine a prefix of a second node that is located in a second geographic region different from the first geographic region as a second prefix different from the first prefix. For example, distributed storage system 100 may set the prefixes of nodes 142, 144, and 146 in second region 141 all as the second prefix. Taking a location prefix having a predetermined three bits as an example, the prefixes of nodes 142, 144, and 146 may be set to 001.

In some embodiments, the location prefix of each of the set of nodes may be added as a prefix to the hash value of each of the set of nodes to obtain the node identifier of each of the set of nodes. For example, the node identifier may be determined as follows:

$$GPID=\text{Geo prefix}+\text{SHA256(Peer Identity)hash value} \quad (1)$$

In equation (1), GPID is used to denote the node identifier, Geo prefix is used to denote the location prefix, SHA256( ) is used to denote the hash algorithm used, Peer Identity is used to denote the attribute information of the node (e.g., node ID, node name, node IP address, etc.), and SHA256 (Peer Identity)hash value is used to denote the hash value of the node.

It should be understood that the method described above for determining a node identifier is merely an example and is not intended to limit the scope of the present disclosure. Any suitable method may be used to determine the node identifier, such as using other hash algorithms to determine the hash value of the node, or using other methods to determine the location prefix.

Several examples of determining the node identifier of each node are described above. Based on the determined node identifier, the logical location of each node in distributed storage system 100, such as in the hash space, may be determined. For example, a logical distance between nodes may be determined based on node identifiers using an exclusive-or (XOR) operation.

Figure 3:
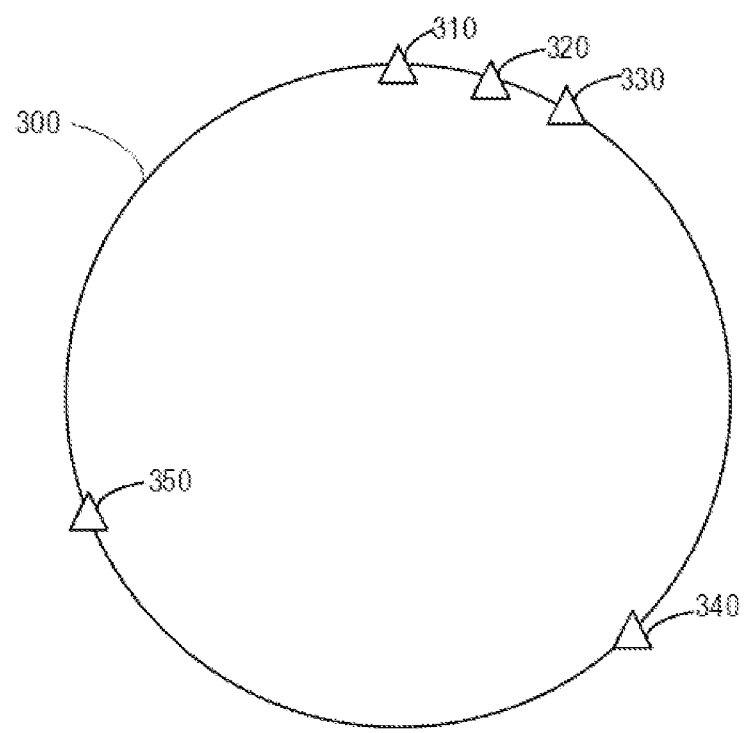
FIG. 3 illustrates a schematic diagram of a distributed storage architecture based on a hash ring according to some embodiments of the present disclosure.

In some embodiments, the nodes may be distributed in distributed storage system 100 in the form of a hash ring. The distance of nodes from each other on the hash ring may identify the logical distance between the nodes. FIG. 3 illustrates a schematic diagram of a distributed storage architecture based on hash ring 300 according to some embodiments of the present disclosure.

In some embodiments, hash ring 300 may refer to a virtual ring to which hash values generated from calculation of the hash function are spatially mapped. For example, when the hash space takes values in the range of 0 to $2^{32}-1$, the hash values may be mapped uniformly to this virtual ring. For example, the hash value 0 may be made to map to the 12 o'clock position of the ring, the hash value $2^{31}$ to map to the 6 o'clock position of the ring, and so on. It should be understood that the range of values and example mapping relationships for the hash space described above are only examples and not limiting. Any appropriate range of values for the hash space may be used.

According to embodiments of the present disclosure, the same hash function may be used to calculate the hash value of each node in a set of nodes. In addition, the location prefix may be determined for each node in the set of nodes according to the same rules (e.g., setting the same number of location prefix bits). Based on the node identifier determined for each node, e.g., according to equation (1), the nodes may be mapped to hash ring 300. As shown in FIG. 3, by way of example only, nodes in the set of nodes are mapped to locations 310, 320, 330, 340, and 350 of hash ring 300 based on their hash values.

As is apparent from the above, the nodes in the set are distributed at corresponding locations on the hash ring based on their node identifiers, while the node identifiers are determined at least in part based on the geographic locations of the nodes. Thus, nodes in proximity to each other on the hash ring are typically also geographically close to each other. For example, node 310, node 320, and node 330 on hash ring 300 are geographically close to each other. In contrast, node 340 and node 350 on hash ring 300 are farther away from nodes 310, 320, and 330. In the example of hash ring 300, nodes 310, 320, and 330 may be viewed as being located in the same region (or geographic region). For exemplary purposes, although FIG. 3 illustrates only five locations corresponding to nodes, the number of locations on the hash ring representing nodes may be arbitrary depending on the number of nodes in the set of nodes.

It should be understood that while each node is mapped to a specific location in the hash ring, the range of storage space that each node has may include the range of hash space between that node and the next node.

By distributing nodes on the hash ring based on node identifiers, the nodes may be distributed based on the geographic locations between the nodes. In this way, the location of a node on the hash ring can reflect the geographic location of the node. This geographic location-based distributed storage system 100 may facilitate operations such as data storage and data searching. In particular, for regional data consumption, this geographic location-based distributed storage system 100 can achieve lower latency and higher efficiency. This geographic location-based distributed storage system 100 is particularly suitable for fields such as smart manufacturing, smart cars, etc.

Still referring to FIG. 2, at block 230, distributed storage system 100 determines, in response to a processing request from a first node in the set of nodes for first data, a target node in the set of nodes based on the node identifier of each of the set of nodes. The target node is used to process the processing request for the first data. The first data may also be referred to as a first data block.

In some embodiments, the processing request from the first node for the first data may, for example, be a read request from the first node for the first data. In some embodiments, the processing request from the first node for the first data may also be some other access request, such as a write request, for the first data. In such a case, distributed storage system 100 may determine, based on the node identifier of each of the set of nodes, at least one node that is no more than a threshold distance from a logical location of the first node as a set of candidate nodes. For example, at least one node, e.g., node 320, on hash ring 300 that is no more than the threshold distance from node 310 may be determined as a set of candidate nodes. The threshold distance may be predetermined or may be set based on the size of the region or the number of nodes within the region.

Additionally, distributed storage system 100 may search for, from the set of candidate nodes, a target node that stores the first data. The found target node may provide the first data to the first node. That is, the first node may read or access the first data from the target node.

In some embodiments, distributed storage system 100 may store node identifiers of the set of candidate nodes that are logically close to the first node into a routing table (also referred to as a bucket). Distributed storage system 100 may search for, based on this routing table, the target node that stores the first data. Distributed storage system 100 may store the node identifiers and addresses of the candidate nodes in association as entries in the routing table.

Figure 4:
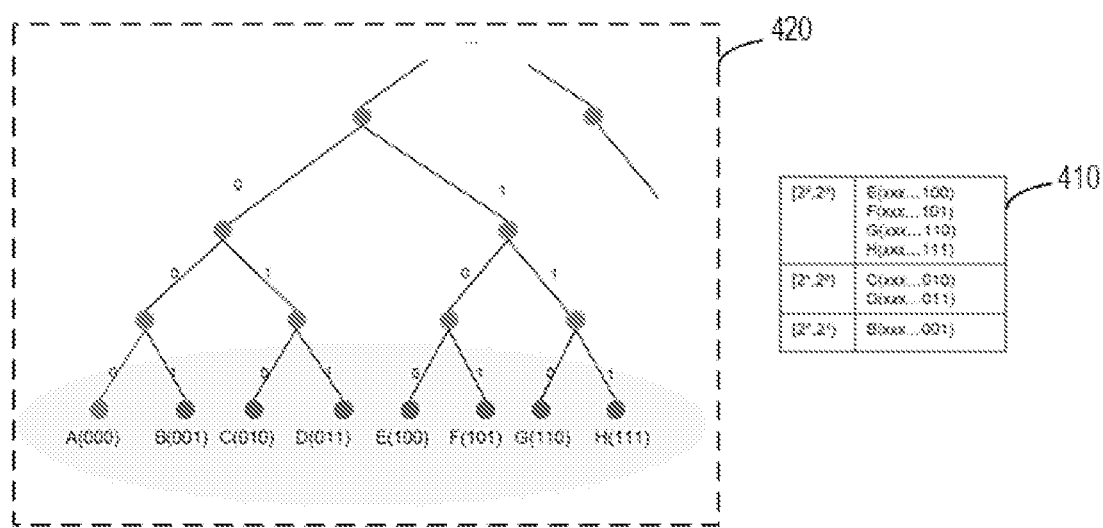
FIG. 4 illustrates a schematic diagram of a data search architecture based on a routing table according to some embodiments of the present disclosure.

FIG. 4 illustrates a schematic diagram of a data search architecture based on a routing table according to some embodiments of the present disclosure. In the example of FIG. 4, node A is the first node. The node identifier of node A is determined as "xxx . . . 000," where "xxx" denotes the location prefix of node A, "000" denotes the last three bits of the identifier, and " . . . " indicates that the middle bits are omitted for ease of description. At least one node having the same location prefix as that of node A may be added to the routing table for node A. For example, the logical distance between nodes may be determined by using an XOR algorithm for each node based on the node identifier, so that a node for which the logical distance does not exceed the threshold distance is added to the routing table for node A. An appropriate threshold distance may be set such that the location prefixes are the same.

Routing table 410 illustrates an example routing table for node A. In routing table 410, each node has the same location prefix "xxx." The first column in routing table 410 shows the range of logical distances from node A, and the second column shows the nodes within the corresponding range of distances and their node identifiers. For example, node B with a logical distance of 1 from node A has the node identifier "xxx . . . 001." Similarly, the node identifiers of the other candidate nodes C, D, E, F, G, and H are also shown. In the example of routing table 410, the distance threshold is set to 7, so that only 7 candidate nodes are included in the routing table. It should be understood that the distance threshold may be set to a smaller or larger value, and fewer or more candidate nodes may be included in the routing table.

Lookup tree 420 based on the routing table is also illustrated in FIG. 4. The first data may be searched out based on lookup tree 420 by traversing nodes B, C, D, E, F, G, and H in, for example, a left-to-right order. As previously mentioned, data typically moves within the same region, so there is a high probability that the first data will be found in a candidate node in routing table 410. Compared to conventional solutions where several hops (in each hop, several nodes in the routing table in that hop will be searched) are usually required to search for the first data, the target node that stores the first data can be quickly located in a routing table according to the present solution by using a routing table determined based on node identifiers determined according to geographic locations. In this way, it is possible to avoid jumping to other routing tables (i.e., to nodes remote from the region) to search for the data. In this way, it is possible to save data searching time and thus to locate the data quickly.

Additionally or alternatively, in some embodiments, the processing request from the first node for the first data may, for example, include: requesting, by the first node, storage of metadata for the first data generated at the first node. The metadata may at least include one or more pieces of information such as a storage location of the first data, a size of the first data, a source of the first data, and the like. When a certain node (e.g., a client device) requests to access the first data, it is typically first necessary to find metadata of the first data in a distributed hash table of the distributed storage system to locate the first data. Thus, it is desirable that the metadata of the first data be stored on a node located in the same region as the first data, thereby speeding up data locating and search.

In some embodiments, to enable metadata to be stored on a node located within the same region as the first data, distributed storage system 100 may determine a data identifier of the metadata based on a first node identifier of the first node and a hash value of the first data. The hash value of the first data may be determined based on the same hash algorithm as the one that is used to calculate the hash value of the node. An example method for determining a data identifier is described below:

$$GCID = \text{Geo prefix} + \text{SHA256(Content Identity)hash value} \quad (2)$$

In equation (2), GCID is used to denote the data identifier, Geo prefix is used to denote the location prefix, SHA256( ) is used to denote the hash algorithm used, Content Identity is used to denote the content identity of the first data (e.g., the attribute of the data, the ID of the data, etc.), and SHA256(Content Identity)hash value is used to denote the hash value of that data.

It should be understood that the method described above for determining a data identifier is merely an example and is not intended to limit the scope of the present disclosure. Any suitable method may be used to determine the data identifier, such as using other hash algorithms to determine the hash value of the data, or using other methods to determine the location prefix.

In some embodiments, distributed storage system 100 may determine the target node in the set of nodes based on a comparison of the node identifier of each of the set of nodes with the data identifier determined in the approach described above. For example, distributed storage system 100 may determine, based on the determined data identifier, a node with the shortest logical distance (e.g., as calculated by an XOR algorithm) to the data identifier from the node identifiers of the set of nodes as the target node. This target node may be used to store the metadata.

Alternatively, distributed storage system 100 may determine, based on the determined data identifier, at least one node of which the logical distance from the data identifier does not exceed a predetermined threshold distance from the node identifiers of the set of nodes as a set of candidate target nodes. Distributed storage system 100 may select the target node from the set of candidate target nodes arbitrarily or based on, for example, the remaining storage space of the node, etc. The scope of the present disclosure is not limited in this regard.

In this way, it can be ensured that the metadata of the first data generated by the first node is stored in a target node located in the same region as the first node. It should be understood that the target node may be any node located in that region. The target node may also be the first node itself. By storing the metadata of the first data on the target node in the same region, it is possible to facilitate subsequent search, processing, etc. of the first data. In this way, the performance of distributed storage system 100 can be further improved.

Additionally or alternatively, in the example in FIG. 4 in which routing table 410 is used, distributed storage system 100 may search for a node with the shortest logical distance to the data identifier from routing table 410 as the target node. By using the routing table, the target node can be more easily searched out, thereby further reducing the time spent on data storage.

Figure 5:
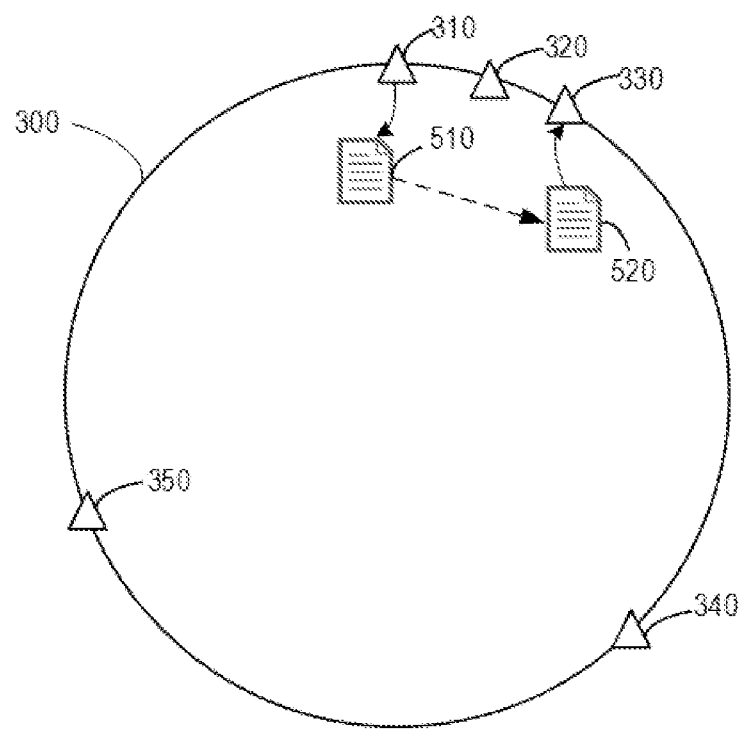
FIG. 5 illustrates a schematic diagram of storage of metadata based on a hash ring according to some embodiments of the present disclosure.

FIG. 5 illustrates a schematic diagram of storage of metadata based on hash ring 300 according to some embodiments of the present disclosure. In the example of FIG. 5, first data 510 is generated at node 310. Distributed storage system 100 may determine a data hash value of metadata 520 for first data 510 according to the node identifier of node 310 and the hash value of first data 510. Distributed storage system 100 may then determine, based on the data hash value, a target node with the closest logical path on hash ring 300. For example, in the example of FIG. 5, node 330 may be determined as the target node. Distributed storage system 100 may broadcast and store metadata 520 into node 330.

It should be understood that the example of FIG. 5 is merely illustrative and not limiting. In other examples, other nodes, e.g., node 320, located in the same region as node 310, or node 310 itself may be determined as the target node based on the node identifiers of the nodes and that data identifier.

By means of the approaches to determining a node identifier and a data identifier based on the geographic location in the present disclosure, it is possible to store the first data generated by the first device and the metadata of the first data in the same region (e.g., they may be stored on the same nodes in the same region or on different nodes in the same region). Moreover, since data requests (e.g., read requests or write requests) for this data are usually made by nodes located in the same region, it is possible, by using the solution of the present disclosure, to quickly locate the metadata within this same region and thus quickly locate the data. The present solution is thus able to avoid the high probability of inefficient cross-region data searching and data acquisition in conventional solutions. In summary, embodiments of the present disclosure provide an optimized distributed storage system solution that can reduce system latency and improve system efficiency.

Figure 6:
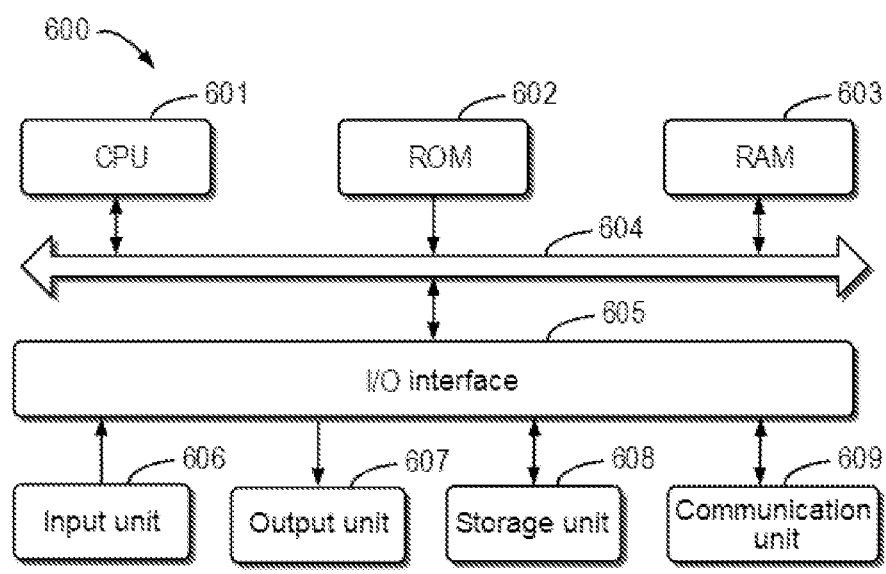
FIG. 6 illustrates a schematic block diagram of an example device that can be used to implement embodiments of the present disclosure.

FIG. 6 illustrates a schematic block diagram of example device 600 that can be used to implement embodiments of the present disclosure. For example, one or more nodes of distributed storage system 100 as shown in FIG. 1 may each be implemented by device 600. As shown in FIG. 6, device 600 includes central processing unit (CPU) 601 that may perform various appropriate actions and processing according to computer program instructions stored in read-only memory (ROM) 602 or computer program instructions loaded from storage unit 608 to random access memory (RAM) 603. Various programs and data required for the operation of device 600 may also be stored in RAM 603. CPU 601, ROM 602 and RAM 603 are connected to each other through bus 604. Input/output (I/O) interface 605 is also connected to bus 604.

A plurality of components in device 600 are connected to I/O interface 605, including: input unit 606, such as a keyboard and a mouse; output unit 607, such as various types of displays and speakers; storage unit 608, such as a magnetic disk and an optical disc; and communication unit 609, such as a network card, a modem, and a wireless communication transceiver. In some embodiments, input samples can be input to device 600 via input unit 606. Communication unit 609 allows device 600 to exchange information/data with other devices via a computer network, such as the Internet, and/or various telecommunication networks.

The various processes and processing described above, such as method 200, may be performed by CPU 601. For example, in some embodiments, method 200 may be implemented as a computer software program that is tangibly included in a machine-readable medium, such as storage unit 608. In some embodiments, part of or all the computer program may be loaded and/or installed onto device 600 via ROM 602 and/or communication unit 609. One or more actions of method 200 described above may be performed when the computer program is loaded into RAM 603 and executed by CPU 601.

Illustrative embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may hold and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any appropriate combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or more programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described herein with reference to flow charts and/or block diagrams of the method, the apparatus (system), and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented by using a special hardware-based system that executes specified functions or actions, or implemented using a combination of special hardware and computer instructions.

Example embodiments of the present disclosure have been described above. The above description is illustrative, rather than exhaustive, and is not limited to the disclosed various embodiments. Numerous modifications and alterations will be apparent to those of ordinary skill in the art without departing from the scope and spirit of the illustrated embodiments. The selection of terms used herein is intended to best explain the principles and practical applications of the various embodiments or the improvements to technologies on the market, so as to enable persons of ordinary skill in the art to understand the embodiments disclosed herein.

What is claimed is:

1. A method for data storage, comprising:
    determining, based on attribute information of each of a set of nodes in a distributed storage system, a hash value of each of the set of nodes;
    determining a node identifier of each of the set of nodes based on geographic location information of each of the set of nodes and the hash value, the node identifier being used to indicate a logical location of a node in the distributed storage system; and
    determining, in response to a processing request from a first node in the set of nodes for first data, a target node in the set of nodes based on the node identifier of each of the set of nodes, the target node being used to process the processing request for the first data;
    wherein the node identifiers of respective ones of the nodes are each determined at least in part as a function of the hash value of that node and the geographic location information of that node;
    wherein the node identifiers collectively establish a hash topology for the respective nodes in which particular nodes that are geographically close to one another within a given region have respective node identifiers that are logically close to one another in the hash topology; and
    wherein determining the target node comprises performing at least one XOR operation to determine a logical distance between node identifiers of respective ones of the nodes.

2. The method according to claim 1, wherein determining the node identifier of each of the set of nodes comprises:
    determining a location prefix of each of the set of nodes based on the geographic location information of each of the set of nodes, the location prefix having a predetermined number of bits; and
    adding the location prefix of each of the set of nodes as a prefix to the hash value of each of the set of nodes to obtain the node identifier of each of the set of nodes.

3. The method according to claim 2, wherein determining a location prefix of each of the set of nodes comprises:
    determining a location prefix of a first node in the set of nodes that is located in a first geographic region as a first prefix; and
    determining a location prefix of a second node in the set of nodes that is located in a second geographic region different from the first geographic region as a second prefix different from the first prefix.

4. The method according to claim 1, wherein the processing request for the first data comprises a read request from the first node for the first data.

5. The method according to claim 1, wherein determining a target node in the set of nodes comprises:
    determining, based on the node identifier of each of the set of nodes, at least one node that is no more than a threshold distance from a logical location of the first node as a set of candidate nodes;
    searching for, from the set of candidate nodes, the target node that stores the first data; and
    providing, by the target node, the first data to the first node.

6. The method according to claim 5, wherein determining the set of candidate nodes comprises:
    performing an XOR operation on a second node identifier of a second node in the set of nodes and a first node identifier of the first node to determine a logical distance between the first node and the second node; and
    adding the second node to the set of candidate nodes if the logical distance does not exceed the threshold distance.

7. The method according to claim 1, wherein the processing request for the first data comprises a request, by the first node, for storage of metadata for the first data generated at the first node.

8. The method according to claim 7, wherein determining a target node in the set of nodes comprises:
    determining a data identifier of the metadata based on a first node identifier of the first node and a hash value of the first data; and
    determining the target node in the set of nodes based on a comparison of the node identifier of each of the set of nodes with the data identifier, the target node being used to store the metadata.

9. An electronic device, comprising:
    at least one processor; and
    at least one memory storing computer program instructions, wherein the computer program instructions, when executed by the at least one processor, cause the electronic device to perform actions comprising:

determining, based on attribute information of each of a set of nodes in a distributed storage system, a hash value of each of the set of nodes;

determining a node identifier of each of the set of nodes based on geographic location information of each of the set of nodes and the hash value, the node identifier being used to indicate a logical location of a node in the distributed storage system; and determining, in response to a processing request from a first node in the set of nodes for first data, a target node in the set of nodes based on the node identifier of each of the set of nodes, the target node being used to process the processing request for the first data;

wherein the node identifiers of respective ones of the nodes are each determined at least in part as a function of the hash value of that node and the geographic location information of that node;

wherein the node identifiers collectively establish a hash topology for the respective nodes in which particular nodes that are geographically close to one another within a given region have respective node identifiers that are logically close to one another in the hash topology; and wherein determining the target node comprises performing at least one XOR operation to determine a logical distance between node identifiers of respective ones of the nodes.

10. The electronic device according to claim 9, wherein determining the node identifier of each of the set of nodes comprises:

determining a location prefix of each of the set of nodes based on the geographic location information of each of the set of nodes, the location prefix having a predetermined number of bits; and adding the location prefix of each of the set of nodes as a prefix to the hash value of each of the set of nodes to obtain the node identifier of each of the set of nodes.

11. The electronic device according to claim 10, wherein determining a location prefix of each of the set of nodes comprises:

determining a location prefix of a first node in the set of nodes that is located in a first geographic region as a first prefix; and determining a location prefix of a second node in the set of nodes that is located in a second geographic region different from the first geographic region as a second prefix different from the first prefix.

12. The electronic device according to claim 9, wherein the processing request for the first data comprises a read request from the first node for the first data.

13. The electronic device according to claim 9, wherein determining a target node in the set of nodes comprises:

determining, based on the node identifier of each of the set of nodes, at least one node that is no more than a threshold distance from a logical location of the first node as a set of candidate nodes;

searching for, from the set of candidate nodes, the target node that stores the first data; and providing, by the target node, the first data to the first node.

14. The electronic device according to claim 13, wherein determining the set of candidate nodes comprises:

performing an XOR operation on a second node identifier of a second node in the set of nodes and a first node identifier of the first node to determine a logical distance between the first node and the second node; and adding the second node to the set of candidate nodes if the logical distance does not exceed the threshold distance.

15. The electronic device according to claim 9, wherein the processing request for the first data comprises a request, by the first node, for storage of metadata for the first data generated at the first node.

16. The electronic device according to claim 15, wherein determining a target node in the set of nodes comprises:

determining a data identifier of the metadata based on a first node identifier of the first node and a hash value of the first data; and determining the target node in the set of nodes based on a comparison of the node identifier of each of the set of nodes with the data identifier, the target node being used to store the metadata.

17. A computer program product tangibly stored in a non-transitory computer-readable medium and including machine-executable instructions, wherein the machine-executable instructions, when executed by a machine, cause the machine to execute a method for data storage, comprising:

determining, based on attribute information of each of a set of nodes in a distributed storage system, a hash value of each of the set of nodes;

determining a node identifier of each of the set of nodes based on geographic location information of each of the set of nodes and the hash value, the node identifier being used to indicate a logical location of a node in the distributed storage system; and determining, in response to a processing request from a first node in the set of nodes for first data, a target node in the set of nodes based on the node identifier of each of the set of nodes, the target node being used to process the processing request for the first data;

wherein the node identifiers of respective ones of the nodes are each determined at least in part as a function of the hash value of that node and the geographic location information of that node;

wherein the node identifiers collectively establish a hash topology for the respective nodes in which particular nodes that are geographically close to one another within a given region have respective node identifiers that are logically close to one another in the hash topology; and wherein determining the target node comprises performing at least one XOR operation to determine a logical distance between node identifiers of respective ones of the nodes.

18. The computer program product according to claim 17, wherein determining the node identifier of each of the set of nodes comprises:

determining a location prefix of each of the set of nodes based on the geographic location information of each of the set of nodes, the location prefix having a predetermined number of bits; and adding the location prefix of each of the set of nodes as a prefix to the hash value of each of the set of nodes to obtain the node identifier of each of the set of nodes.

19. The computer program product according to claim 18, wherein determining a location prefix of each of the set of nodes comprises:

determining a location prefix of a first node in the set of nodes that is located in a first geographic region as a first prefix; and determining a location prefix of a second node in the set of nodes that is located in a second geographic region different from the first geographic region as a second prefix different from the first prefix.

20. The computer program product according to claim 17, wherein the processing request for the first data comprises a read request from the first node for the first data.

* * * * *